United States Patent [19]

Yapp et al.

[11] Patent Number: 5,297,931
[45] Date of Patent: Mar. 29, 1994

[54] FORWARD SKEW FAN WITH RAKE AND CHORDWISE CAMBER CORRECTIONS

[75] Inventors: Martin G. Yapp, Needham; Robert Van Houten, Winchester, both of Mass.; Robert I. Hickey, Concord, N.H.

[73] Assignee: Airflow Research and Manufacturing Corporation, Watertown, Mass.

[21] Appl. No.: 52,811

[22] Filed: Apr. 28, 1993

Related U.S. Application Data

[63] Continuation of Ser. No. 753,418, Aug. 30, 1991, abandoned.

[51] Int. Cl.$^5$ .................................................. E01D 1/02
[52] U.S. Cl. ............................... 415/208.1; 415/208.2; 416/223 R
[58] Field of Search .............. 416/223 R, 223 A, 189, 416/169 A; 415/119, 914, 170.1, 208.1, 208.2, 208.3

[56] References Cited

U.S. PATENT DOCUMENTS

| | | | |
|---|---|---|---|
| Re. 32,462 | 7/1987 | Yoshinaga et al. | 415/914 |
| 2,981,461 | 4/1961 | Murphy . | |
| 3,189,260 | 6/1965 | Ivanov | 230/120 |
| 3,285,501 | 11/1966 | McDonald . | |
| 3,307,776 | 3/1967 | White . | |
| 3,447,741 | 6/1969 | Havette et al. | 415/914 |
| 3,627,440 | 12/1971 | Wood . | |
| 3,972,646 | 8/1976 | Brown et al. | 415/119 |
| 4,357,914 | 11/1982 | Hauser . | |
| 4,358,245 | 11/1982 | Gray . | |
| 4,432,694 | 2/1984 | Kuroda et al. . | |
| 4,569,631 | 2/1986 | Gray, III . | |
| 4,791,520 | 12/1988 | Stegmüller . | |
| 4,871,298 | 10/1989 | Vera | 416/189 |
| 4,900,229 | 2/1990 | Brackett et al. . | |
| 4,981,461 | 1/1991 | Henderson . | |
| 5,000,660 | 3/1991 | Van Houten et al. . | |

FOREIGN PATENT DOCUMENTS

| | | |
|---|---|---|
| 0168594 | 5/1985 | European Pat. Off. . |
| 1905269 | 8/1970 | Fed. Rep. of Germany . |
| 2462465 | 4/1977 | Fed. Rep. of Germany . |
| 62-282198 | 8/1987 | Japan . |
| 0282198 | 12/1987 | Japan ............................ 416/223 R |
| WO86/01263 | 2/1986 | PCT Int'l Appl. . |
| 918559 | 7/1982 | U.S.S.R. . |
| 2124303 | 2/1984 | United Kingdom . |

OTHER PUBLICATIONS

Azimian et al., J. Turbomachinery, 112:145-150 (1990).
Translation of Japanese patent JP 62-282198 (Otsatu Reference). Aug. 1987.

*Primary Examiner*—Edward K. Look
*Assistant Examiner*—Mark Sgantzos
*Attorney, Agent, or Firm*—Fish & Richardson

[57] ABSTRACT

An improvement to forwardly skewed axial fans whereby blade camber and rake are coordinated with skew. The blades are characterized in that a line defined by the points of maximum chordwise camber ($f_{max}$) as a function of changing radial position (r) is on the leading edge side of the mid-chord line ($M_{CL}$) at values of r toward the root of the blade, and is less forwardly skewed than the leading edge (LE), the mid-chord line ($M_{CL}$), and the trailing edge (TE) of said blade; the blade is raked forwardly so that the trailing edge of the blade tip is axially forward of the trailing edge at the blade root; rake (k) increases monotonically as radial position r increases from 0.75R to 1.0R, R being the fan radius; the blade has a relatively large pitch ratio (P/D); and rake is corrected to reflect the chordwise position of maximum camber. As a result, the fan produces a flow that is generally in radial equilibrium having a reduced component of flow normal to the2 desired axial flow and normal to the tangential flow. The coordinated fan can be (but need not be) combined with a housing/band configuration for controlling airflow that recirculates (i.e., counter to the desired axial airflow) in a channel formed between the band and housing.

12 Claims, 11 Drawing Sheets

FORWARD SKEW FAN WITH RAKE AND CHORDWISE CAMBER CORRECTIONS

This application is a continuation of U.S. application Ser. No. 07/753,418, filed Aug. 30, 1991, now abandoned.

BACKGROUND OF THE INVENTION

This application relates to axial flow fans having forwardly skewed blades, particularly banded plastic fans such as those designed for automotive applications and for other air handling applications including computer cooling and heating/cooling of buildings.

In various applications, axial fans are designed to move airflow through adjacent heat exchangers or through air channels. Noise, strength, packaging (size) and efficiency (energy consumption) are important considerations in many axial fan applications.

In particular, it has been found that a fan whose blades are forwardly skewed (e.g., the mid-chord line and/or the leading edge of the fan's blades are curved in the direction of fan rotation) will exhibit significantly less noise, all other things being equal. See, Gray, U.S. Pat. No. 4,358,245. Gray '245 also teaches that it is useful in forwardly skewed blade designs to increase the blade angle with increasing radius.

Gray U.S. Pat. No. 4,569,631 discloses a fan having a forward skew at the blade tip and a rearward skew at the blade root so that the overall angular dislocation in the plane of rotation between the blade root and the blade tip is reduced, providing greater strength. The blade angle remains relatively constant at the blade tip.

Brackett et al. U.S. Pat. No. 4,900,229 discloses an axial flow fan having a blade with a sinusoidally shaped leading edge.

E.P. 0 168 594 discloses an axial fan with blades that have a forwardly curved leading edge.

U.S. Pat. No. 5,000,660 discloses an axial fan having multiple blades with different degrees of skew, either forward or back.

U.S. Pat. 4,791,520 discloses a forwardly skewed fan blade having a controlled trailing edge.

U.S. Pat. No. 4,981,461 discloses a fan having blades with an abrupt change in skew and a high forward skew at the blade tip.

McDonald, U.S. Pat. No. 3,285,501, discloses a centrifugal fan having vanes 30 positioned to produce an annular ring of spinning air around the inlet of the fan wheel.

White, U.S. Pat. No. 3,307,776, discloses a centrifugal fluid flow apparatus having guide vanes 16 to guide and stabilize leakage flow around the fan.

Murphy, U.S. Pat. No. 2,981,461, discloses a centrifugal fan which uses the flow of air off of the open outer edges of the blades as a volume control—i.e., outlet vortical flow rotating in the direction of fan rotation can be recirculated as secondary air into the rotor inlet to reduce net volume.

Kuroda et al., U.S. Pat. No. 4,432,699, discloses a centrifugal blower having hair-like elements 69 (FIG. 6) mounted in a wall of passage between the fan and an inlet shroud. The hair-like elements increase resistance to reduce recirculation.

Hauser, U.S. Pat. No. 4,357,914, discloses a cooling fan for use with a radiator having a baffle ring 11 to reduce recirculation.

Wood, U.S. Pat. No. 3,627,440, discloses a seal plate 30 for an inlet for a centrifugal fan to assist the boundary layer to distribute the inlet air uniformly.

Schwaebel, DEOS 24 62 465 discloses a compressor turbine having ribs in the gap between the rotor blade tips and the housing.

Bruno, DEOS 1 905 269 discloses an impeller having a seal between the neck ring of the impeller and the ventilator suction opening.

SU 918,559 discloses a centrifugal pump having flanges which engage ring-shaped projections of a seal ring.

SUMMARY OF THE INVENTION

We have discovered an improvement to axial flow fans whose blades have forwardly swept leading edges (at least where $r/R > 0.9$), whereby blade camber and rake corrections improve fan performance and efficiency. By carefully coordinating the camber, rake, and skew of such fans, it is possible to reduce noise, yet maintain a relatively high pitch ratio. The resulting fans are low noise, high efficiency fans, achieving design pressure and flow for a given application at relatively lower rotational speeds. Specifically, fans according to the invention have blades characterized as follows:*

*The terms used are generally known to those in the field and are defined in detail below, with reference to figures, so those definitions need not be repeated here.

a) in an axial projection of the blade, a line defined by the points of maximum chordwise camber ($f_{max}$) as a function of changing radial position (r) is on the leading edge side of the mid-chord line ($M_{CL}$) at values of r toward the root of the blade, and the $f_{max}$ radial function is less forwardly skewed than the leading edge (LE), the mid-chord line ($M_{CL}$), and the trailing edge (TE) of said blade;

b) the blade is raked forwardly so that the trailing edge of the blade tip is axially forward, or "upstream" (from the perspective of the desired axial airflow), of the trailing edge at the blade root;** the absolute value of the amount of forward rake (k) increases monotonically as radial position r increases from 0.75R to 1.0R, R being the fan radius; most preferably the first derivative of the absolute value of rake with respect to r ($dk(r)/dr$) also increases monotonically as r increases from 0.75R to 1.0R;

** The sign of the rake distance is arbitrary, and, for purposes of this application, we have assigned a negative sign to forward rake as defined above.

c) the blade has a relatively large pitch ratio (P/D), equal to at least 0.6 generally throughout the extent of the blade; more preferably, P/D is at least 0.75 even at radii from 0.75R to 1.0R; and most preferably, P/D is at least 0.8 in that range; and d) rake (k), at any given radial position r where $r/R > 0.75$, is substantially a linear function of the mid-chord angular displacement ($AD_{MC}$) at radial position r expressed in degrees, with a correction for the chordwise position of maximum camber to maintain radial equilibrium in the airflow.

In preferred embodiments, the blades of the fan are further characterized as follows: a) the chord length C of each blade, and most preferably the first derivative thereof with respect to radial position ($dC(r)/dr$), increase monotonically as radius r increases from 0.75R to 1.0R; b) the absolute value of the skew (or angular displacement)*** of the mid-chord of each blade ($AD_{MC}$), and most preferably the first derivative thereof with respect to radial position ($AD_{MC}(r)/dr$), increases monotonically with respect to increasing radial position r for values of r where $r/R > 0.75$; c) the absolute value of the overall (root-to-tip) angular displacement of the mid-chord line ($AD_{MC}$) of each blade is at least 0.25 the blade spacing ($360°/N$, where N=number of blades); e) the leading edge sweep angle ($S_{LE}$) is at least 50° at a point between $r/R = 0.9$ and $r = R$; f) the maximum camber to chord ratio ($f_{max}/C$) decreases monotonically with increasing radial position (i.e., the first derivative with respect to radius of the maximum camber to chord ratio [$df_{max}/C(r)/dr$] is negative) and most preferably the second derivative of that function [$d^2 f_{max}/C(r)/dr^2$] is positive; g) rake k is a linear function of mid-chord angular displacement corrected for the chordwise position of the maximum camber ($X_{fmax}$) by a specific function explained below and illustrated in FIG. 3, $k(r_N) = A + B - C$; h) the pitch ratio P/D is at least 0.8 at all values of r; and i) the pitch ratio P/D decreases monotonically as r increases from 0.75R to 1.0R.

*** As with rake, the sign of the skew or angular displacement is arbitrary. For purposes of this application, we have assigned a negative sign to forward skew as defined above. For leading edge forward sweep, however, we assign a positive sign.

As described in greater detail below, fans according to the invention produce an airflow having a reduced radial flow component at the outer radius where the blade is highly forwardly skewed. [In this context, radial flow component means a component of flow in a direction normal to the desired axial flow, and normal to the tangential flow as well.]

Fans according to the invention produce a flow that generally is in radial equilibrium. Specifically, the radial inflow momentum is controlled so that the wake diameter is large and the flow velocity is low, thereby enhancing overall fan efficiency. In particular, wasted energy goes up as a function of $1/WD^4$ as WD (the wake diameter) decreases.

A second aspect of the invention features a housing/band configuration for controlling the airflow that recirculates (i.e. counter to the desired axial airflow) in a channel formed between the band and housing. The second aspect is advantageously combined with the first aspect of the invention, but it may also be used on fans that do not include the first aspect of the invention. Specifically, the housing (e.g., a shroud for a fan associated with a heat exchanger or a duct housing a fan) defines a cylindrical opening sized to receive the band. The band is cooperatively sized and positioned to mate with a groove around the circumference of the opening in the housing, so as to define a tortuous channel between the housing and the band for recirculating airflow. The channel comprises an array of stators having generally radial flow control surfaces, shaped to remove swirl from the recirculating airflow. The band and housing form a restriction before (upstream of, from the perspective of recirculating airflow) the flow control surfaces, so that a substantial amount of the available total pressure is used to accelerate the recirculating airflow to a high velocity before it encounters the stators. In this way, the recirculating airflow is forced to engage the stators, because there is substantially no static pressure field to curve the streamlines so that they can avoid the stators. In one embodiment the restriction is formed by an axial lip extending from the downstream edge of the band to form a restriction at the inlet to the channel. Alternatively, the lip extends from the upstream edge of the band to form a restriction in the middle of the channel. The cross-sectional area of the channel at the restriction is less than ½ of the cross-sectional area of the channel outlet. Downstream of the stators the cross-sectional area increases to reduce recirculation flow velocity and thus minimize interference with mainstream flow. The stators are shaped to provide low flow resistance—i.e., they have radiused leading edges and are thin.

A third aspect of the invention features another housing/band configuration for controlling recirculation airflow, which can be combined with the first aspect, with the second aspect, or both. The third aspect features a stator/channel configuration having a radially oriented inlet (i.e. it is positioned to receive radially directed recirculation airflow. The upstream (from the perspective of recirculating airflow) portion of such stators is positioned radially outward of the inlet so that centrifugal force entrains recirculating airflow into the stators. The stators extend perpendicular to the inlet, axially downstream in the channel. In one embodiment, the channel outlet, which is formed between a lip on the band and the housing, constitutes the restriction in recirculation flow. This configuration works because there is insufficient surface area exposed to the leakage flow exiting the outlet to cause swirling. Alternatively, the restriction can be upstream of the stators as in the second embodiment to further ensure entrainment with the stators.

As explained in greater detail below, by removing swirl from recirculating airflow, the second and third aspects of the invention provide a more organized incoming airflow to the fan, so that the fan blades are oriented at a proper angle of attack.

Other features and advantages of the invention will be apparent from the following description of the preferred embodiments thereof (including the drawings) and from the claims.

DETAILED DESCRIPTION

We will first briefly describe the figures.

Before describing specific fans which embody the invention, I will briefly define the terms used in this application with reference to the drawings.

Figure 1A:
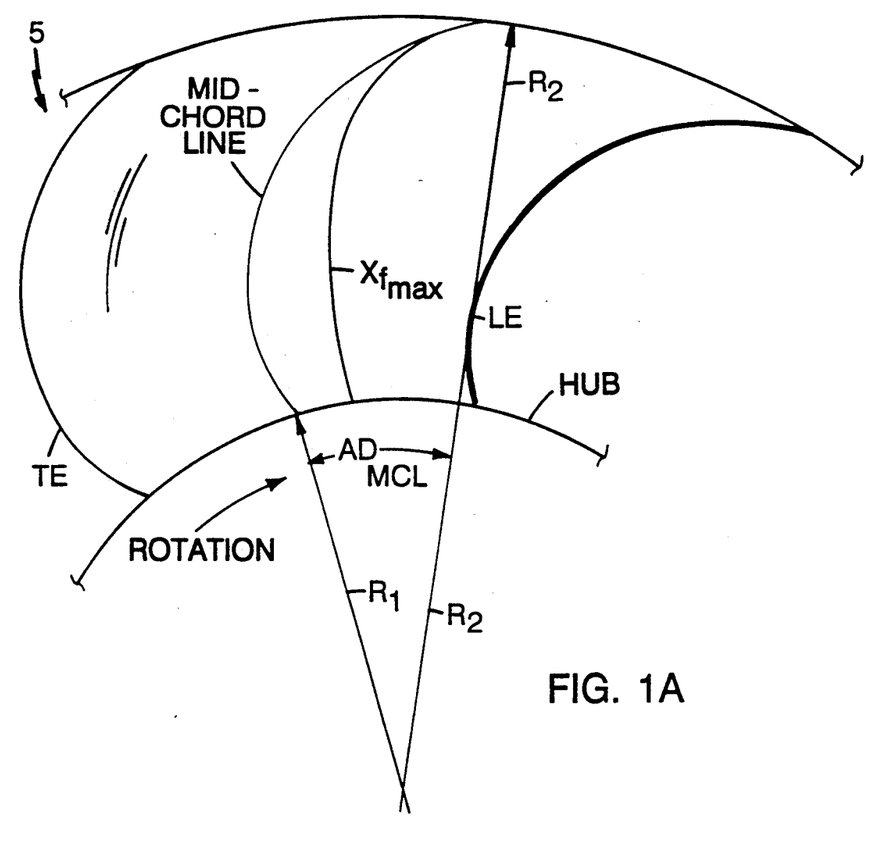
FIGS. 1A and 1B are axial projections of a fan blade according to the invention, defining the leading edge sweep angle ($S_{LE}$) at radius $R_3$, the radial position (r), the mid-chord line ($M_{CL}$), the angular displacement of the mid-chord line ($AD_{MC}$) between $R_1 = r_{(HUB)}$ and $R_2 = R$, the line defined by points of maximum camber ($f_{max}$), and the trailing edge (TE).
Figure 1B:
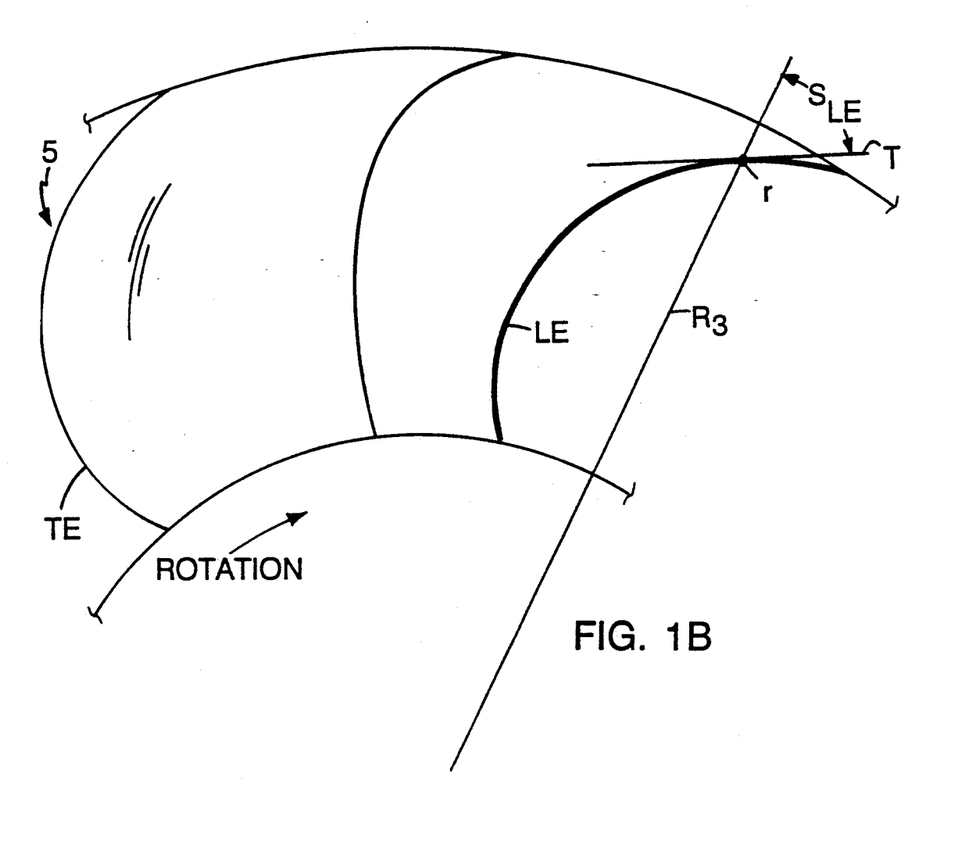

Forward sweep angle ("S") of a particular radial function, such as the axial projection of the leading edge ($S_{LE}$) is expressed in angular units as the angle S between a radius ($R_3$ in FIG. 1B) through point r on the radial function in question and a tangent T to the function at point r. Thus, FIG. 1B illustrates the forward sweep of the leading edge ($S_{LE}$) of blade 5 at r. Those skilled in the field will understand that the forward sweep of other radial functions such as the trailing edge, the mid-chord line and the radial function of maximum camber ($f_{max}(r)$) can be similarly illustrated.

Skew angle or net angular displacement ("AD") of particular radial function from $R_1$ and $R_2$ such as the mid-chord line ("$M_{CL}$") is the angle between a radius through $r_1$ and a radius through $r_2$. As shown in FIG. 1A, the $AD_{MC}$ is the angle between radius $R_1$ (through $M_{CL}$ at the hub) and $R_2$ (through $M_{CL}$ at r=R).

Figure 2:
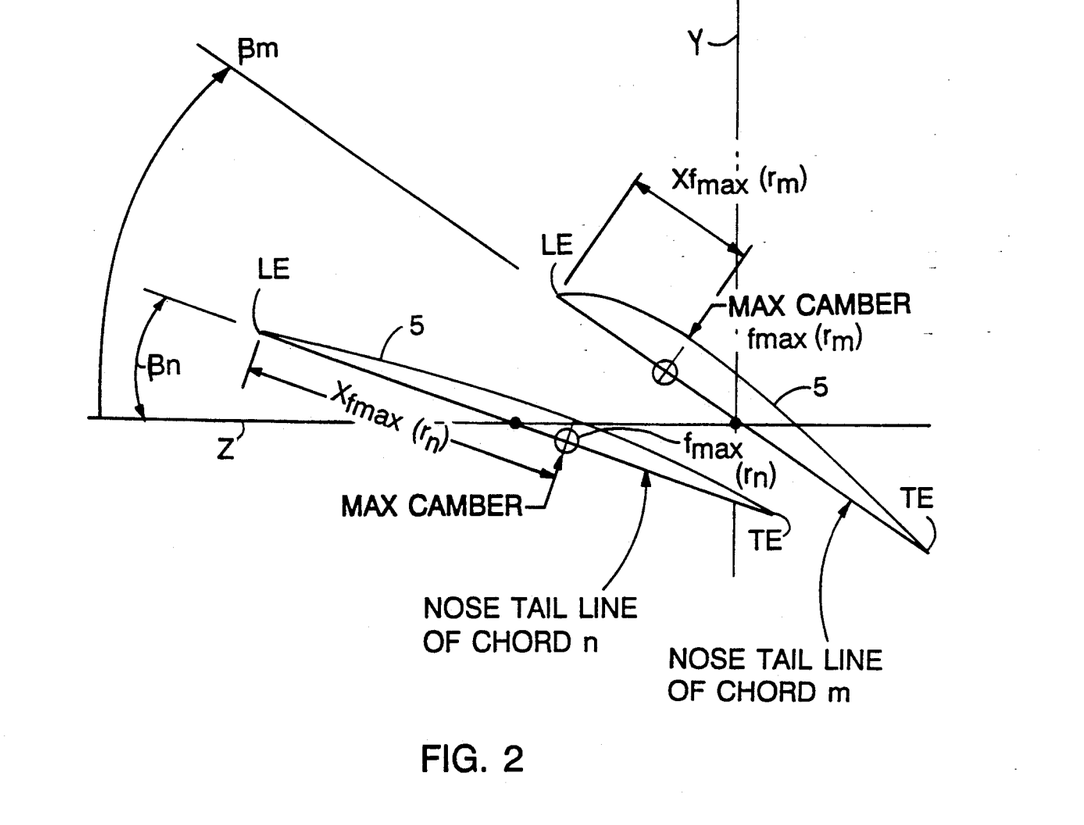
FIG. 2 is a projection of a blade showing skew and camber, with no rake correction to the location of maximum camber ($X_{fmax}$).
Figure 3:
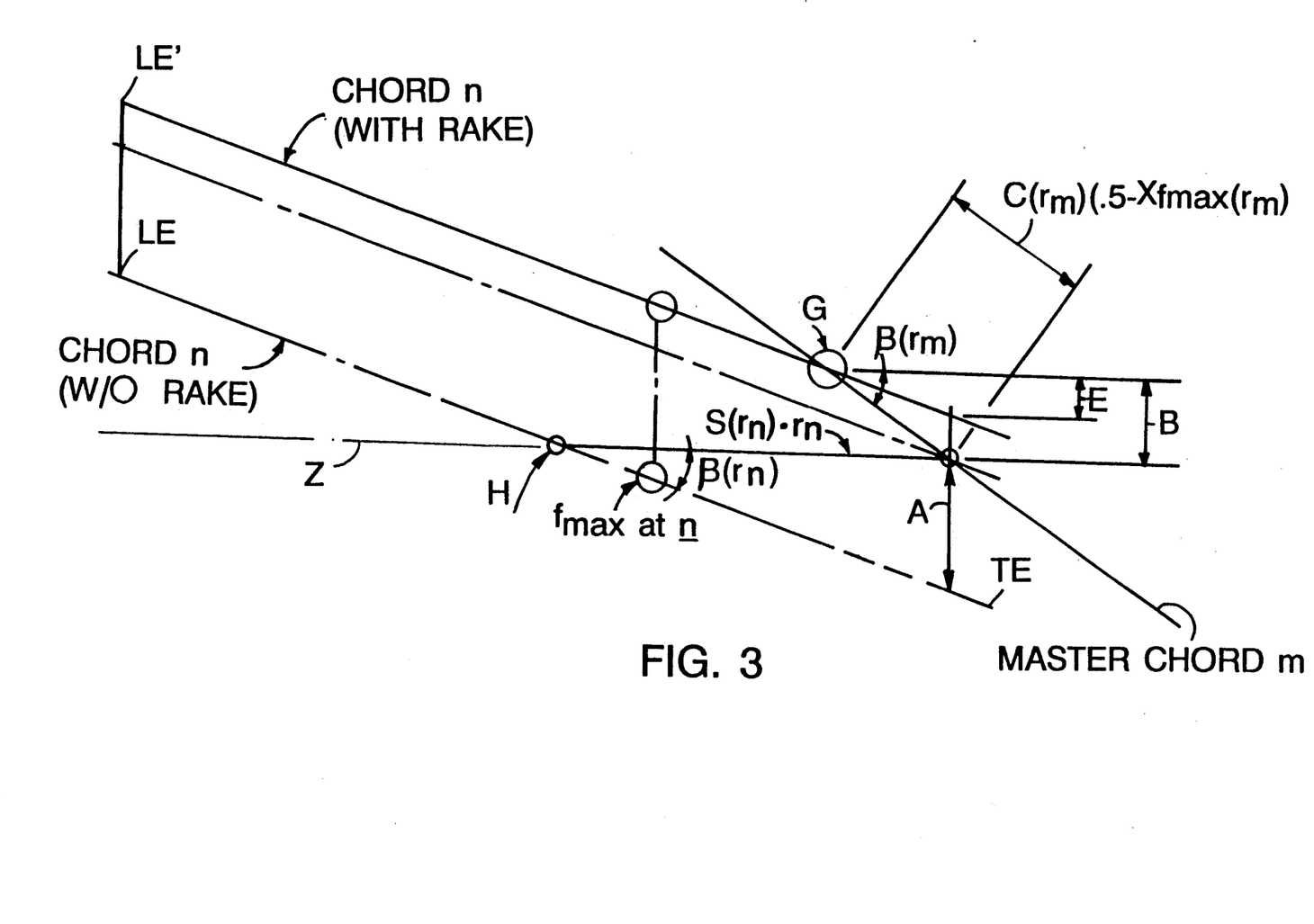
FIG. 3 illustrates the correction of rake (k) for the chordwise position of maximum camber $X_{fmax}$.
Figure 4A:
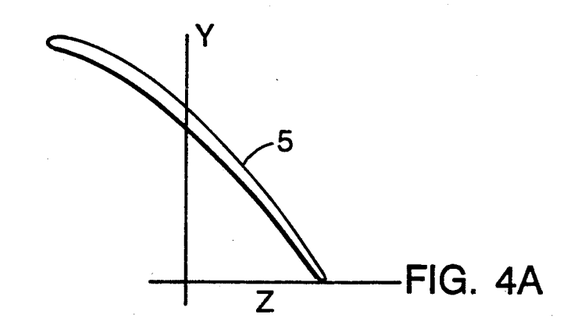
FIGS. 4A–4D show blade projections in their rake-corrected positions, for four evenly spaced values of r.
Figure 4B:
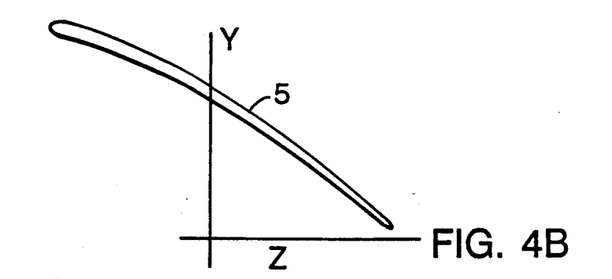
Figures 4C, 4D:
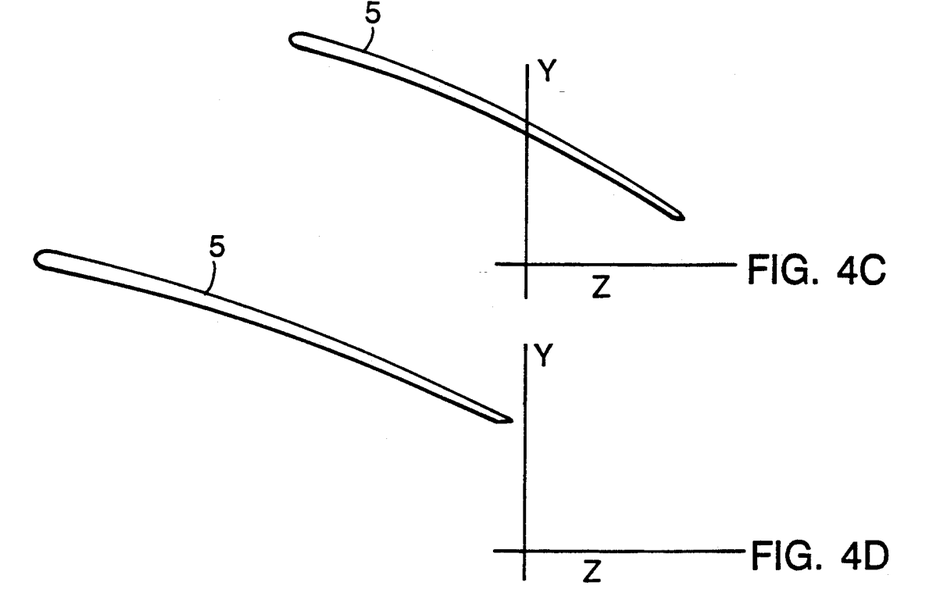

The pitch ratio P/D is the pitch P (the axial distance $2\pi r \cdot \tan\beta$ where $\beta$ is the blade angle, see FIGS. 2 and 3) divided by D, the fan diameter. Blade angle $\beta$ is the angle on a cylinder of radius r between the nose-tail line of chord C and the plane of rotation, as shown in FIG. 2, discussed below.

FIG. 2 shows two blade sections (at chords for radii "m" and "n", respectively). In FIG. 2, coordinate Z is the axis of fan rotation and coordinate Y is an intersection of the plane of fan rotation with the section. Blade chord distance C is the length of the nose-tail line of intersection with a cylinder of radius r. Mid-chord line ($M_{CL}$) is the line defined by the center of blade chord nose-tail lines C as r varies from the hub to R. See FIG. 1A. The Blade Camber f at radial position r is the length of a line normal to the nose-tail line of chord C at a particular distance X from the leading edge of chord C. The maximum camber radial function is a line defined by the points of maximum camber ($f_{max}$) for chords at radius r as radius r varies from the hub to R. See FIG. 1A. The chordwise location of maximum camber is expressed non-dimensionally as the distance X along the chord from the leading edge, divided by the full chord length C.

Rake (k) is the axial offset at mid-chord. FIG. 3 (in contrast to FIG. 2) illustrates the rake correction as a function of radial position. Specifically, in FIG. 2 there is no rake correction. In FIG. 3, the position of chord n is corrected with reference to chord m, in accordance with the function detailed below.

Having defined the above terms, we will proceed to describe the invention in greater detail. In general, the fan blades (particularly the rake, skew, and chordwise position of maximum camber of the blades) are coordinated to account for the fact that the lift vector of an airfoil-shaped blade is perpendicular to the local streamline and to the lifting surface. Coordination of the blade design according to the invention avoids arbitrary spanwise lift and the introduction of a radial component into the airflow, with attendant inefficiencies.

The radial distribution of skew or mid-chord angular displacement ($AD_{MC}(r)$) and the radial distribution of the leading edge sweep ($S_{LE}(r)$) are chosen to achieve low noise levels. The leading edge sweep and therefore the forward skew is high at the tip of the blade where velocity is high and where the blade and band intersect. Generally, to achieve significant noise benefits the forward sweep angle of the leading edge at the tip must be substantial (e.g., $>50°$). At the root, the leading edge sweep and therefore the skew is low because velocity (noise potential) is low and blade loading is highest. Leading edge sweep near the hub is also avoided because it reduces available chordlength, where fans must be injection molded so one blade cannot be shaded by the next. Generally, skew is limited by chord length at the tip. The trailing edge at the tip must be circumferentially downstream from the leading edge at the root. Angular displacement will be such that a radius passing through the leading edge at the root lies at approximately mid chord at the tip. The leading edge angular displacement in degrees will be greater as the blade chord length increases. Also, the displacement will be greater with smaller blade number.

Because the fan design is carefully coordinated, relatively large pitch ratio P/D values (P/D) can be used. Tip pitch ratio values $>0.8$ have been found acceptable, and pitch inboard of the tip is greater than the tip pitch. Typically, the camber f/C is highest at the root, decreasing consistently to the tip. Typical values are f/C camber (at the hub) f/C=0.10, and at R, f/C<0.04.

Fans according to the invention include rake corrections that spread aerodynamic loading evenly over the entire blade, except that the highly forwardly skewed triangular patch of blade at the tip is purposely left unloaded or given a slightly negative loading to reduce noise.

As shown in FIG. 3, to add a rake correction, the three-dimensional blade is plotted graphically so that chord sections are stacked relative to a common or master radial ray m. It is then possible to calculate the rake corrections k(r) required to move the chord sections approximately onto that common ray. Any radial component of the local lift vector (i.e., a perpendicular to the lift surface) is minimized, so as to maintain radial equilibrium in the fan flow.

Specifically, rake is a linear function of midchord skew, corrected for the chordwise position of the maximum camber ($X_{fmax}$) as follows. The radial function of rake $k(r_n) = A + B - E$, where $A = \pi/180 \cdot AD_{MCL}(r_n) \cdot r_n \cdot \tan\beta(r_n)$; $B = C(r_m)(0.5 - X_{fmax} (r_m)) \cdot \sin\beta(r_m)$; and $E = C(r_m) (0.5 - X_{fmax}(r_m)) \cdot \cos\beta(r_m) \cdot \tan\beta(r_n)$. In the above equations, $r_n$=the radius on any given chord n; $r_m$=the radius of the master chord designated m. G is the location of $f_{max}$ at chord m. LE and TE are the leading edge and trailing edge of chord n without the rake correction. LE' and TE' are the leading edge and trailing edge of chord n after the rake correction. H is the mid-chord point of nose-tail line N. FIG. 3 illustrates and defines $S(r_n)$, $\beta$, and A, B, E, G, and H. The point of maximum camber on chord n ($f_{max}$) is shown for the uncorrected and for the corrected positions of chord n. An additional correction for $f_{max}(n)$ is possible in principle, but this correction is so small that it is not necessary to the proper function of the invention.

FIGS. 4A–4D illustrate one specific fan (designated 7FS2) according to the invention. They are provided to exemplify, not to limit the invention. Specifically, FIGS. 4A–D shows four blade sections at evenly spaced radial intervals, 4A being closest to the hub and 4D being closest to the tip.

The 7FS2 fan is a 7-bladed fan designed to cool computer equipment. The pitch and camber at each radius have been selected to achieve a static pressure rise that is independent of radius r. The angular displacement $AD_{LE}$ of the leading edge (hub-to-tip) is 21°. The blade spacing (angular displacement from corresponding positions on adjacent blades) is 51.4°. The following Table provides values for camber ratio (f/C), chordwise position of maximum camber ($X_{FMAX}/C$) measured from the leading edge, pitch ratio (P/D), chordlength C/D, and rake/D as a function of radial position r as a fraction of fan radius R.

TABLE 1

| r/R | P/D | f/C | C/D | $AD_{MC}$ in deg.** | rake/D* | X fmax/C |
|---|---|---|---|---|---|---|
| 0.550 | 1.440 | .092 | .275 | 0.00 | .0000 | .336 |
| 0.614 | 1.340 | .077 | .284 | 0.59 | .0006 | .336 |
| 0.679 | 1.265 | .064 | .293 | 1.18 | .0014 | .336 |
| 0.743 | 1.206 | .055 | .301 | 0.89 | .0009 | .336 |
| 0.807 | 1.161 | .048 | .312 | −1.06 | −.0033 | .342 |
| 0.871 | 1.126 | .042 | .329 | −5.09 | −.0135 | .359 |
| 0.936 | 1.098 | .036 | .356 | −11.90 | −.0336 | .404 |
| 1.000 | 1.075 | .030 | .383 | −20.00 | −.0618 | .500 |

*Negative rake means the section is axially forward or "upstream" the root.
**Negative displacement means the section is tangentially forward or "upstream" of the root.

Figure 5:
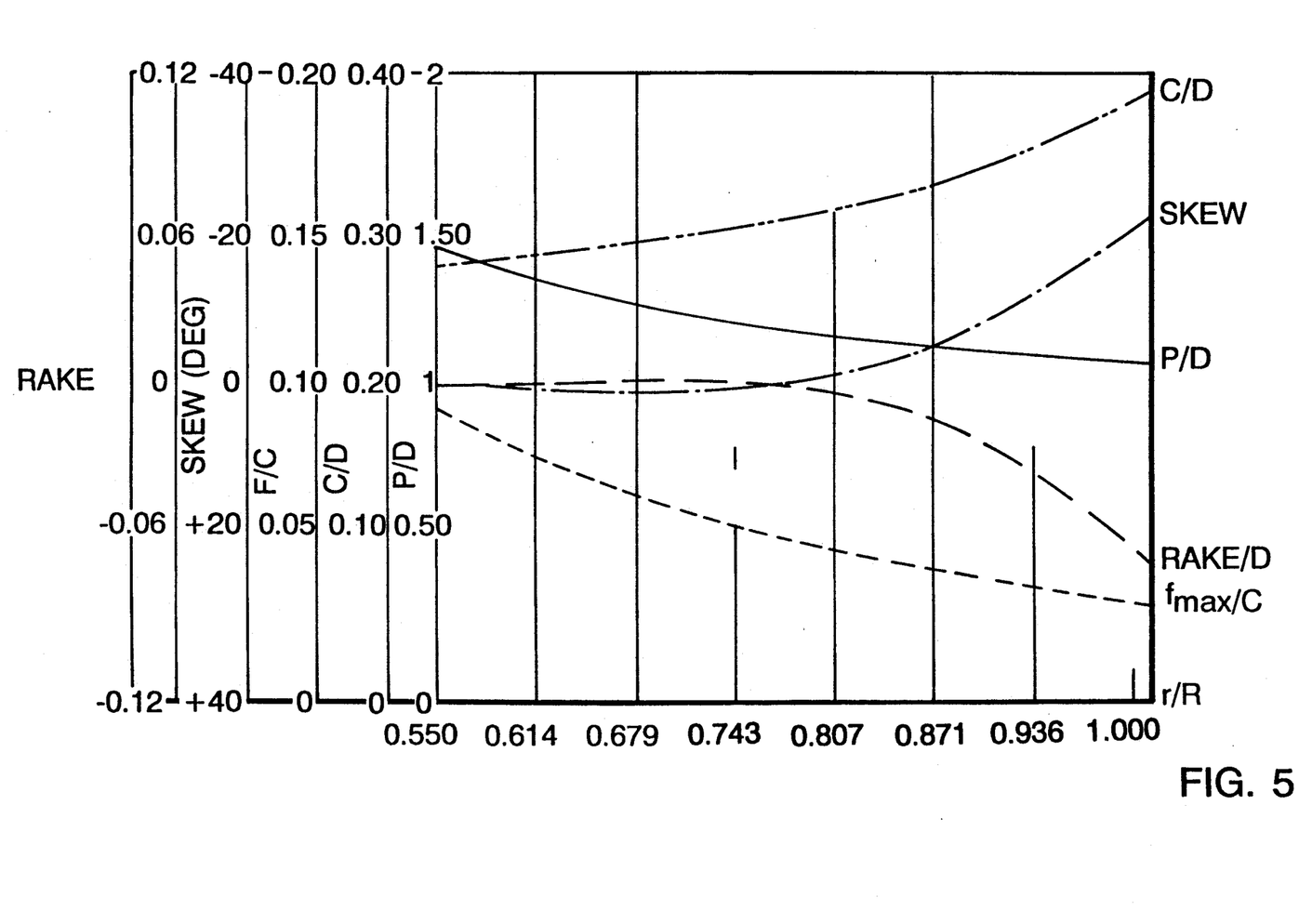
FIG. 5 is a graph depicting various characteristics of the blade of FIG. 4 as a function of radial position.

FIG. 5 is a graph showing the values given in Table 1 as a function of radial position.

FIGS. 6–10 depict a cross-sectional view of fans of leakage stator members positioned between the circumferential band of the fan and the housing within which the fan rotates.

Figures 6A, 6B:
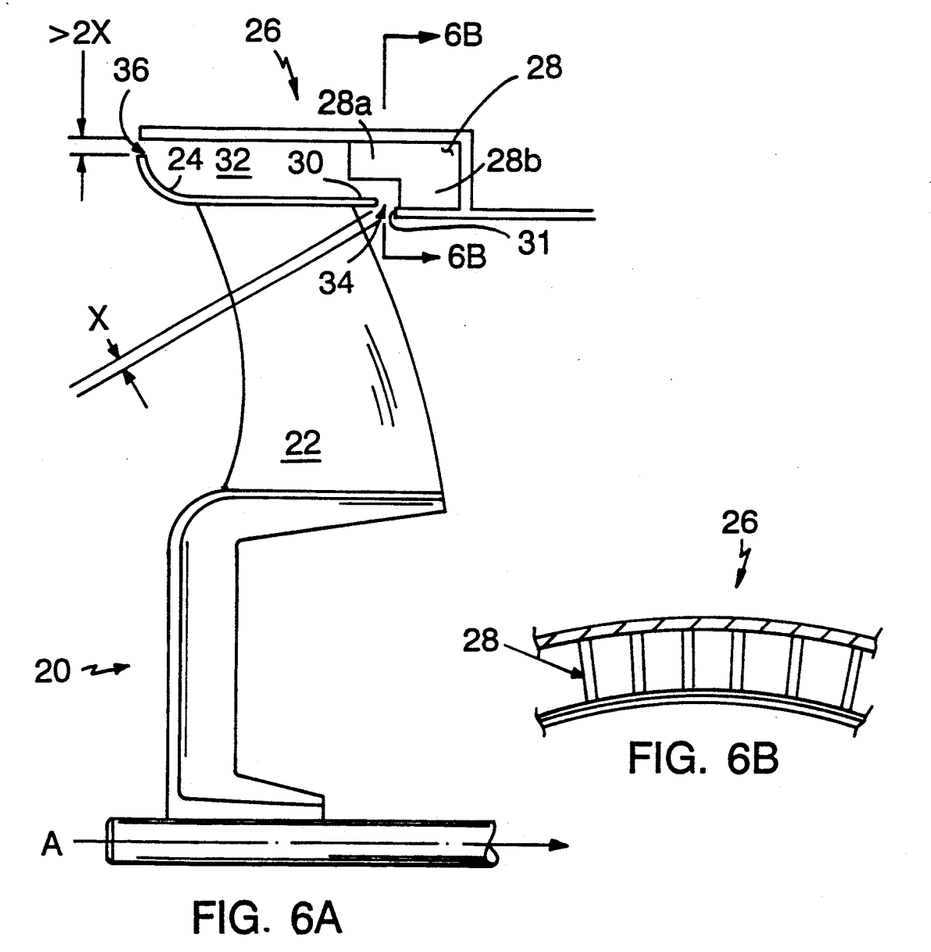
FIGS. 6A, 6B, 7, 8, 9, 10, 11A, and 11B are fan sections showing stator vanes that control recirculating airflow.

FIG. 6A depicts a fan 20 partly in section. Axis A shows the direction of axial airflow generated by fan 20. Blade 22 terminates at the fan circumference in band 24. Housing 26 includes leakage stators 28. Band 24 terminates at its downstream edge in a lip 30. As a whole, band 24 and housing 26 form a channel 32 for recirculation of air from the downstream side of fan 20. The recirculating airflow follows a tortuous path through restriction 34 formed between lip 30 and lip 31 on housing 26. After jetting through restriction 34, flow is entrained in stators 28 where rotation is taken away. The airflow turns 90° to travel along the channel 32 and out. Outlet 36 is formed between the upstream edge of band 24 and housing 26. Preferably, the width of restriction 34 is as narrow as manufacturing processes permit to minimize leakage and resulting lost energy. In practice the width of restriction 34 may be between 0.005 D and 0.02 D (where D=the fan diameter) so as to create a jet to entrain leakage flow in the stators according to the invention. The width of outlet 36 is at least twice the width of inlet 34. Increasing the width of outlet 36 reduces the velocity of the leakage flow thus reducing flow disruption as the recirculation flow enters the main flow. Stators 28 are radially oriented and they are spaced from ⅛ to ½ of an inch apart around the circumference, with the smaller spacing being used in very small fans. The stators include an axially extending portion 28a and a radially extending portion 28b.

FIG. 6B is a view taken along 6B—6B of FIG. 6A, showing stators 28.

Figure 7:
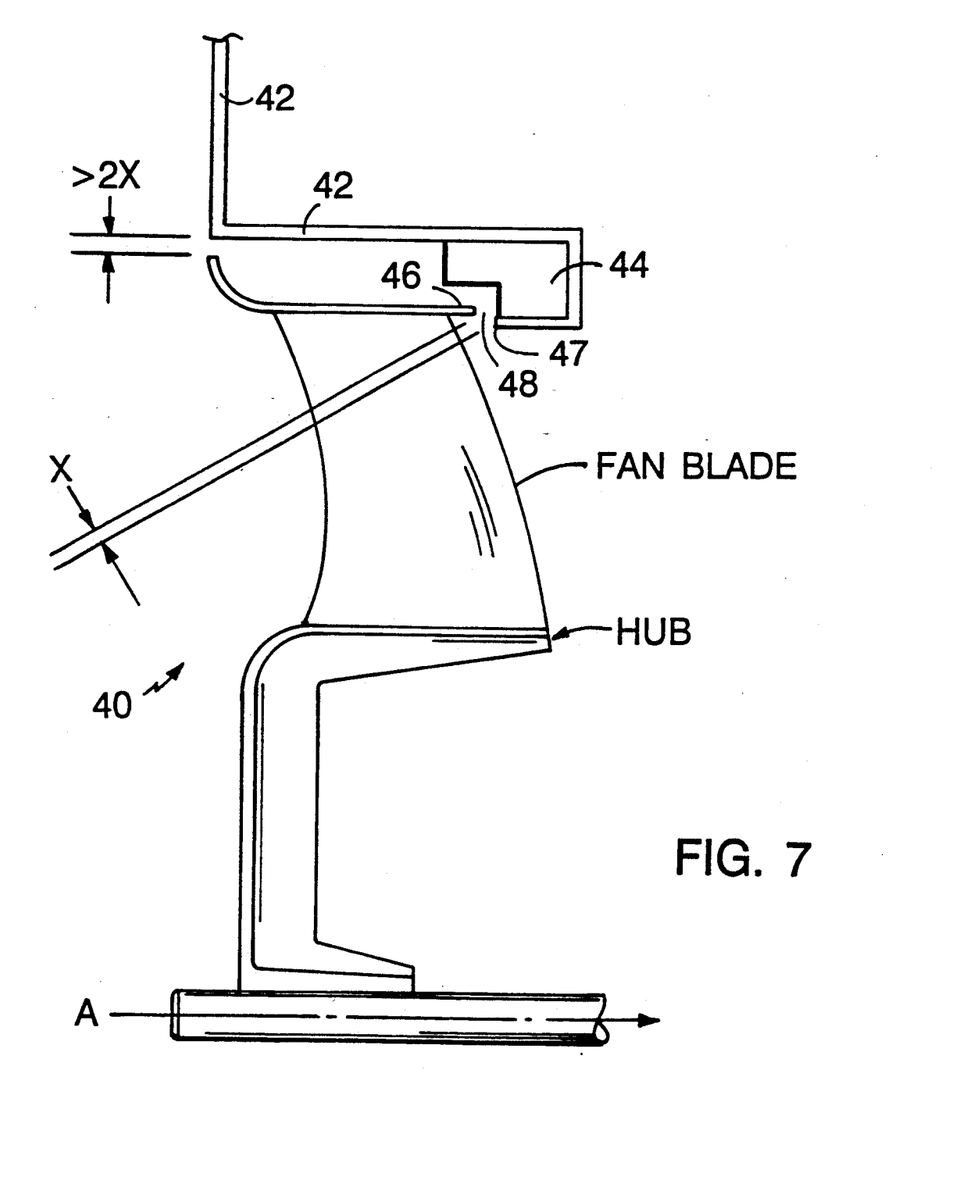

FIG. 7 is similar to FIG. 6A and is particularly designed for a fan 40 housed in a shroud 42 which controls airflow through a radiator (not shown) upstream of the fan. Leakage stators 44 are L-shaped radial. Lip 46 forms a restriction inlet 48 with lip 47. The dimensions of inlet 48 and outlet 50 are the same as described above for FIG. 6B.

Figure 8:
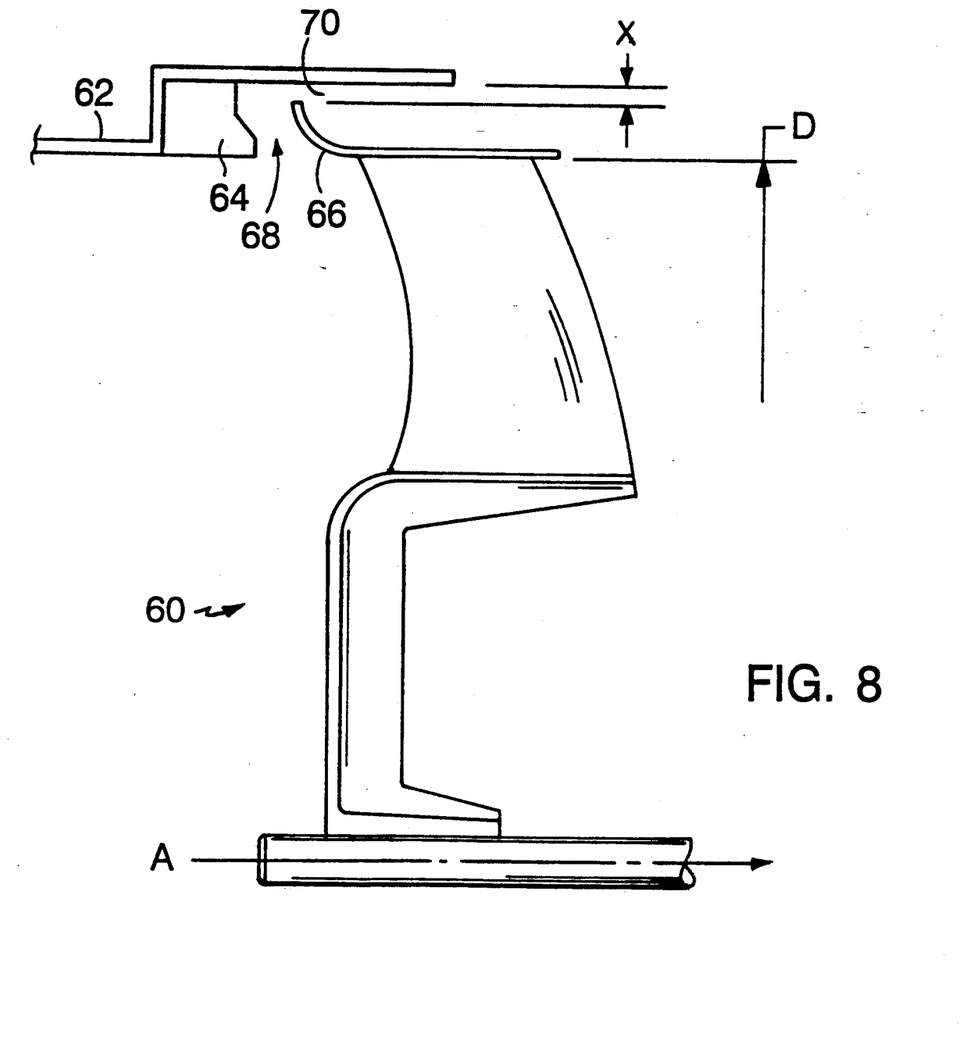

FIG. 8 describes a fan 60 in which the housing 62 is a duct or shroud having stators 64 upstream rather than downstream from band 66. Restriction 70 is formed between the upstream edge of band 66 and duct 62. Once again, this restriction is on the order of 0.005D–0.02D. Recirculating airflow is entrained into stators 64 and leaves through the open side of slots 68.

Figure 9:
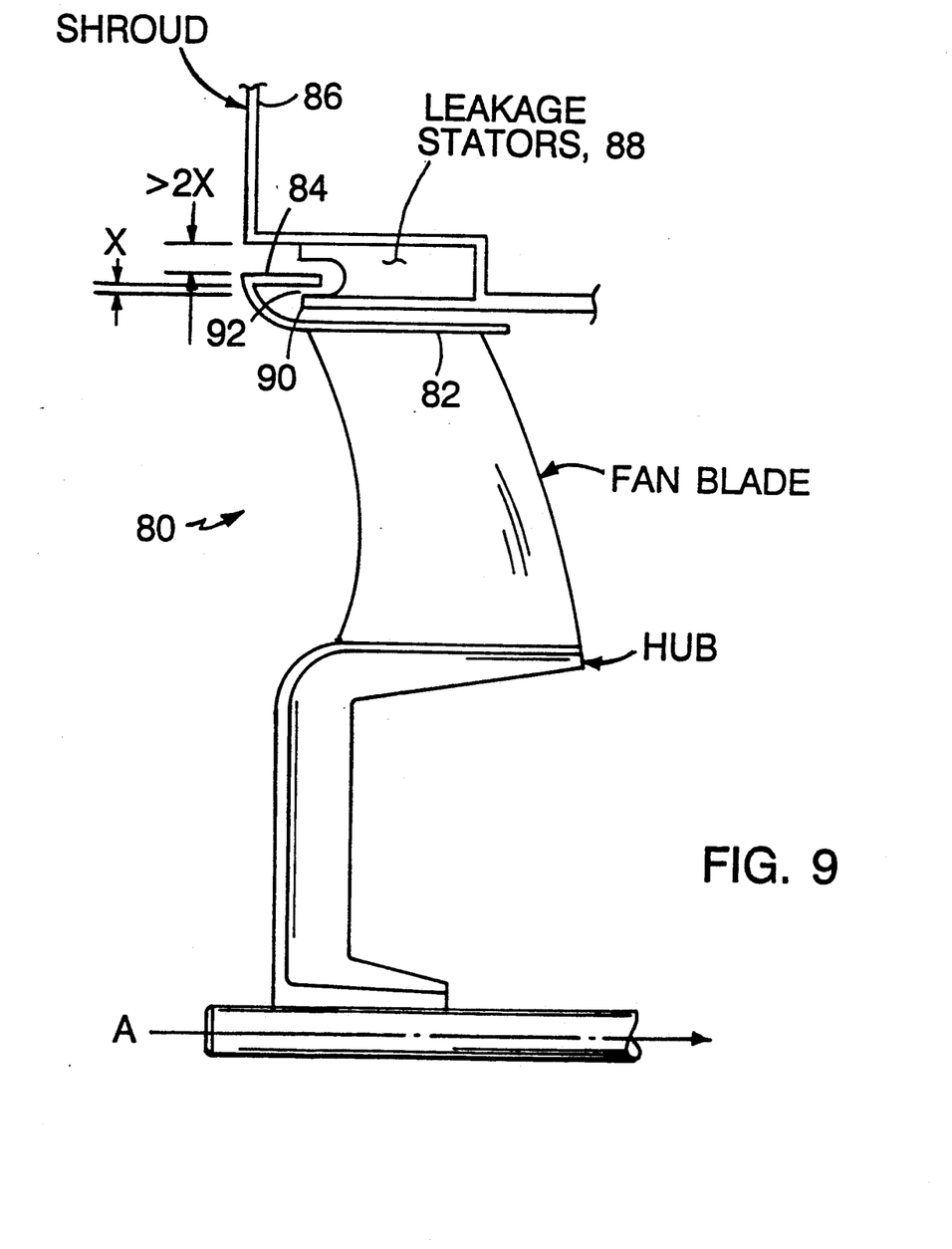

In FIG. 9 fan 80 has a band 82 with an upstream edge that turns back axially to form lip 84. Shroud 86 includes leakage stators 88. A lip 90 on shroud 86 forms a restriction 92 in the recirculation path, which feeds the airflow to stators 88 and from there to outlet 94. As with the other configurations, the outlet is at least twice as wide as the restriction.

Figure 10:
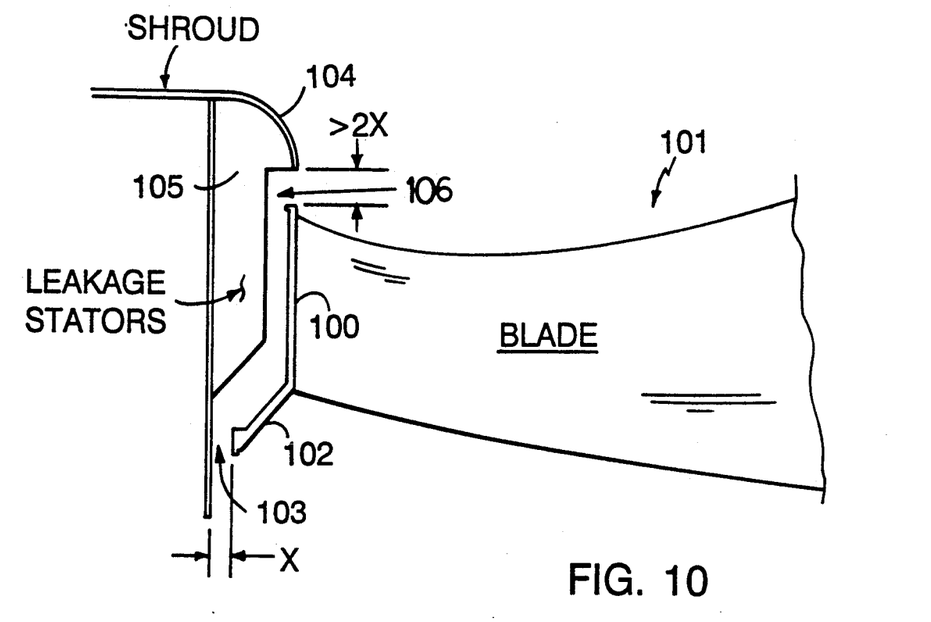

In FIG. 10, band 100 of fan 101 has a trailing lip 102 which forms restriction 103 with shroud 104. Leakage stators 105 extend from shroud 104 to form outlet 106 with the axially forward edge of band 100.

Figure 11A:
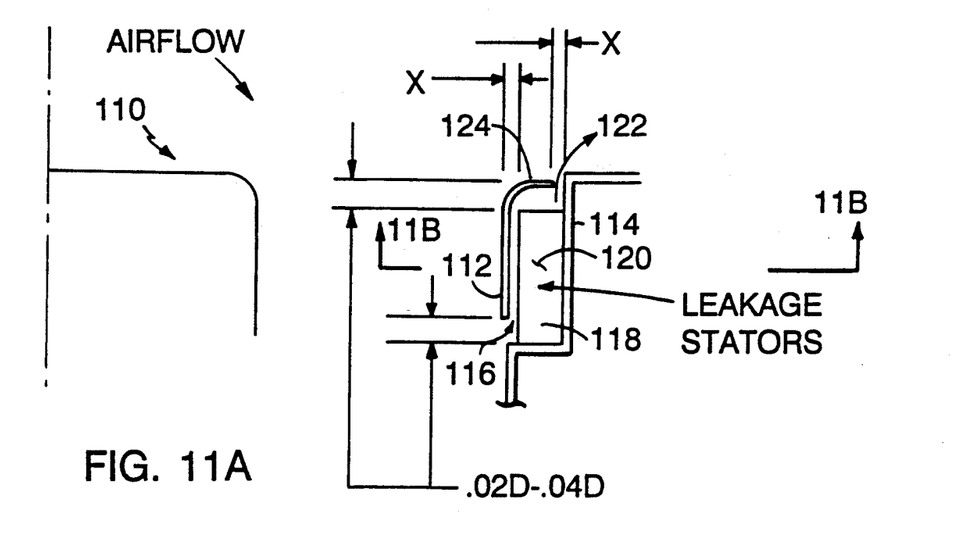
Figure 11B:
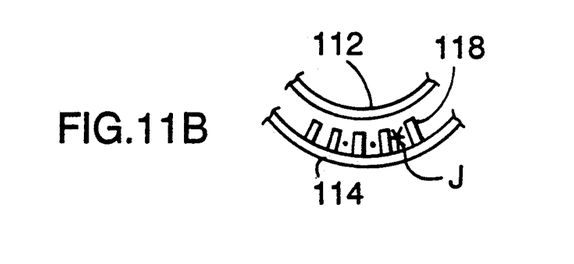

FIGS. 11A and 1B show a fan 110 having a band 112 and a surrounding housing 114 which form a recirculation channel. Inlet 116 to the channel is radially oriented to deliver and entrain radial airflow to the upstream (from the perspective of recirculating airflow) portion 118 of stator 120. Recirculating airflow exits through restricted outlet 122 which is formed between band lip 124 and housing 114.

Unlike the previously described embodiment in the fan of FIGS. 11A and 11B, the restriction is downstream of the stators, and therefore does not accelerate airflow to entrain the airflow in the stators. The embodiment of FIGS. 11A and 11B is effective because centrifugal force throws the leakage into the stators. The stators extend almost to the lip of the band. The recirculating flow does not encounter sufficient surface to regenerate swirl removed by the stators. The cross-sectional area of the passage (i.e., the area between stators 118 in a section taken in a plane perpendicular to the axis, as shown by the shaded area J bounded by 118, 118 and 114 in FIG. 11B) should be greater than the total area of cylindrical inlet 116.

By removing tangential velocity from the recirculation (leakage) flow, the above stators provide the blades a more well-behaved flow so that the local angle of blade attack is correct substantially along the entire blade (including the small annular zone near the band where leakage flow reenters the blade). In this way, flow separation and noise in this zone are controlled.

Most importantly, the flow leaves the leakage stators substantially without rotation or vorticity. As a result, the stators permit a significant reduction in broadband noise and tones caused by interaction between the blade leading edges and the vorticity of rotating leakage flow.

Other embodiments are within the following claims.

We claim:

1. An axial flow fan comprising a hub rotatable on an axis and blades extending in a generally radial direction from said hub to a circular band connecting tips of said blades, each of said blades terminating at a leading edge which is forwardly swept at least in the region defined by r/R>0.90 where r=radial position and R=fan radius, and each of the blades having a trailing edge which is forwardly swept in that region, and each of the blades being characterized in that:

a) in an axial projection of the blade, a line defined by the points of maximum camber ($f_{max}$) as a function of changing radial position (r) is on the leading edge side of the mid-chord line $M_{CL}$ at the root of the blade, said $f_{max}$ radial function being less forwardly skewed than the leading edge, the mid-chord line, and the trailing edge of said blade;

b) the blade is raked forwardly so that the trailing edge of the tip of the blade is axially forward of the trailing edge at the root; the absolute value of said rake (k) increases monotonically as r increases from 0.75R to 1.0R, where R is the fan radius;

c) the blade has a pitch (ratio (P/D)) of at least 0.6 (where P=pitch and D=fan diameter) generally throughout the extent of the blade; and d) the rake (k) where r/R>0.75 is a linear function of the midchord axial displacement ($AD_{MC}$) at radius r expressed in degrees is corrected to reflect the chordwise position of maximum camber.

2. The fan of claim 1 further characterized in that the chord length C of each blade increases monotonically with respect to increasing radius as r increases from 0.75R to 1.0R.

3. The fan of claim 2 further characterized in that the first derivative of chord length with respect to increasing radius (dC(r)/dr) increases monotonically with increasing radius as r increases from 0.75R to 1.0R.

4. The fan of claim 1 further characterized in that the absolute value of the angular displacement of the mid-chord of each blade ($AD_{MC}$) increases monotonically with respect to increasing radius as r increases from 0.75R to 1.0R.

5. The fan of claim 4 further characterized in that the first derivative of the absolute value of the mid-chord angular displacement with respect to r ($AD_{MC}(r)/dr$) increases monotonically with as r increases from 0.75R to 1.0R.

6. The fan of claim 1 further characterized in that absolute value of the overall (from root-to-tip) midchord angular displacement ($AD_{MC}$) of each said blade is at least 0.25·the blade spacing (360°/N, where N=number of blades).

7. The fan of claim 1 further characterized in that the absolute value of the leading edge sweep angle ($S_{LE}$) is at least 50° at a point between r=0.9R and r=R.

8. The fan of claim 1 further characterized in that the maximum blade camber to chord ratio ($f_{max}/C$).

9. The fan of claim 1 further characterized in that absolute value of the rake k is substantially a linear function of midchord skew S corrected for the chordwise position of the maximum chamber ($X_{fmax}$) according to the function $k(r_n) = A + B - E$.

10. The fan of claim 9 further characterized in that first derivative of the absolute value of rake with respect to r(dk(r)/dr) increases mononically as r increases from 0.75R to 1.0R.

11. The fan of claim 1 further characterized in that the pitch ratio (P/D) decreases monotonically as r increases from 0.75R to 1.0R.

12. The fan of claim 1 wherein the pitch ratio (P/D) > 0.8 at all values of R.

* * * * *